(12) United States Patent
Kuroda

(10) Patent No.: US 6,603,961 B1
(45) Date of Patent: Aug. 5, 2003

(54) DIVERSITY RECEIVING APPARATUS

(75) Inventor: Shinichi Kuroda, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/495,644

(22) Filed: Feb. 1, 2000

(30) Foreign Application Priority Data

Feb. 1, 1999 (JP) ......................................... P11-023660

(51) Int. Cl.$^7$ ................................................. H04B 7/02
(52) U.S. Cl. ...................... 455/133; 455/134; 455/135; 455/277.1; 455/278.1; 370/206; 370/208; 370/210
(58) Field of Search ................................. 455/133, 134, 455/135, 277.1–278.1, 78; 379/267, 347; 370/206, 207, 208, 209, 210, 335, 342

(56) References Cited

U.S. PATENT DOCUMENTS

| 5,559,838 | A | * | 9/1996 | Nakagoshi | .................. 375/347 |
| 6,021,317 | A | * | 2/2000 | Irvin | ........................... 455/78 |
| 6,047,019 | A | * | 4/2000 | Ishii | ............................ 375/206 |
| 6,181,749 | B1 | * | 1/2001 | Urabe et al. | ................. 375/267 |
| 6,182,264 | B1 | * | 1/2001 | Ott | .............................. 714/774 |
| 6,246,713 | B1 | * | 6/2001 | Mattisson | .................... 375/132 |
| 6,512,738 | B1 | * | 1/2003 | Namekata et al. | .......... 370/210 |
| 2002/0085653 | A1 | * | 7/2002 | Matsuoka et al. | .......... 375/347 |
| 2003/0053412 | A1 | * | 3/2003 | Yoshida et al. | ............. 370/208 |

* cited by examiner

*Primary Examiner*—William Trost
*Assistant Examiner*—Danh C Le
(74) *Attorney, Agent, or Firm*—Jay H. Maioli

(57) ABSTRACT

A diversity receiving apparatus for receiving data that has been primarily modulated and then secondarily modulated includes a plurality of uni-directivity antennas arranged so that they orient in different directions, a signal information detector for detecting signal information of all frequency bands of received signals of each of the uni-directivity antennas, a branch selector for selecting one of received signals of the individual branches received by the uni-directivity antennas, a secondarily modulated data demodulator for demodulating data that has been secondarily modulated as the received signal selected by the branch selector, and a primarily modulated data demodulator for primarily demodulating data that has been primarily modulated as an output signal of the secondarily modulated data demodulator, wherein the branch selector is controlled correspondingly to an output signal of the signal information detector.

5 Claims, 5 Drawing Sheets

+

+

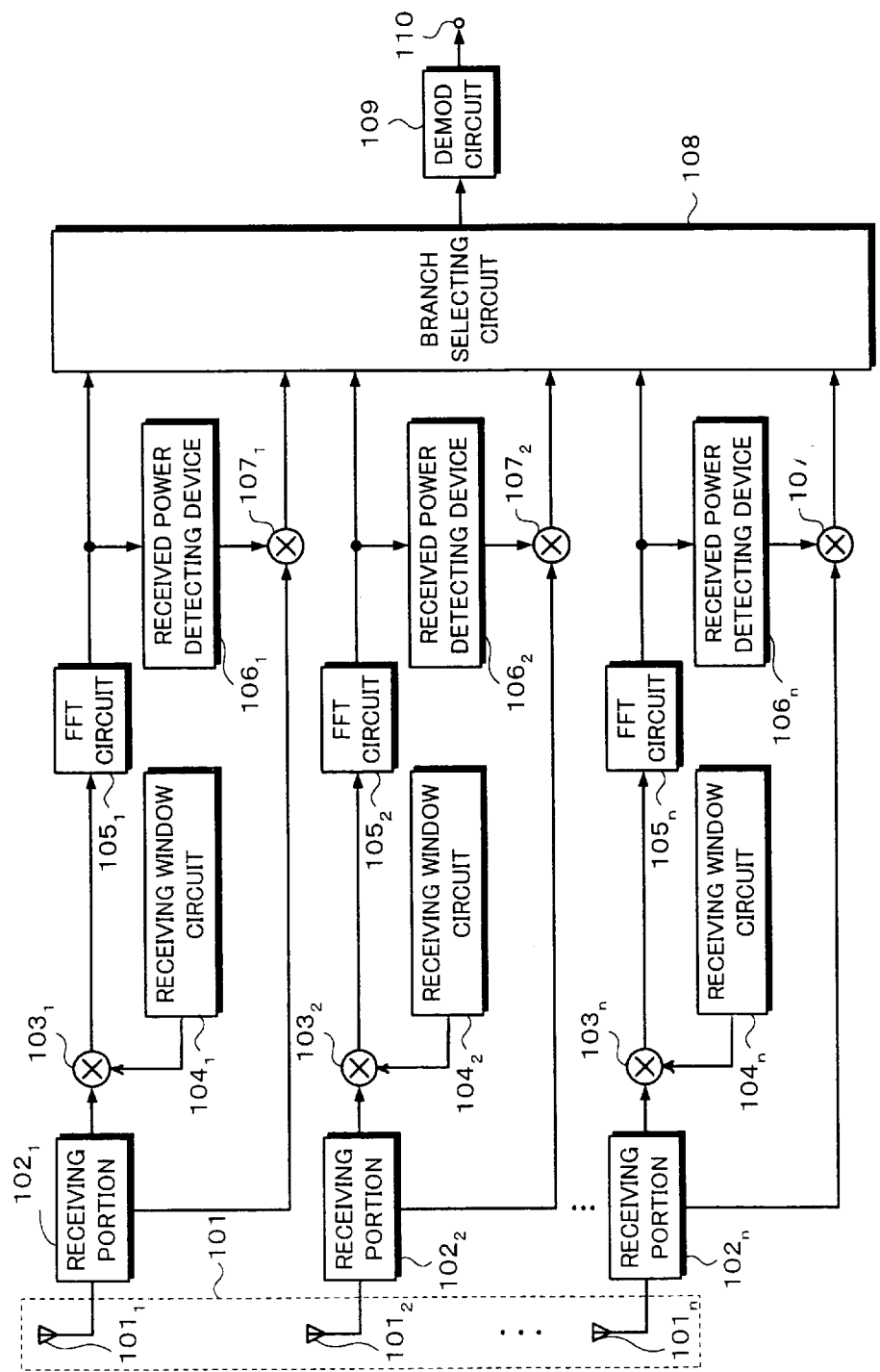

DIVERSITY RECEIVING APPARATUS

BACKGROUND OF THE INVENTION

1. Field of the Invention

The present invention relates to a diversity receiving apparatus suitable for a communication system such as a high speed wireless LAN (Local Area Network).

2. Description of the Related Art

In recent years, LAN has been widely used in offices so that information processing apparatuses such as computers that are connected with cables are effectively used. More recently, technologies of wireless LAN have been developed and are becoming common. Although the transmission rate of information of wireless LAN is at most on the order of several Mbps. However, to transmit multimedia data such as moving pictures on the real time basis, a high speed data transmission as high as several ten Mbps has been intensively studied so that it can be used in near future.

One of the major bottlenecks to be considered in increasing the transmission rate of information and widening the frequency band thereof is an influence of a transmission distortion on a multiplexed wave transmission path. In other words, in an environment of which a multi-path wave takes place, it is clear that a fading deteriorates the communication quality of the received signal. Particularly, in a high speed data transmission environment, the fading results in a frequency fluctuation and an inter-code interference as critical problems as well as the influence of the transmission distortion. As the data transmission rate rises, the transmission distortion becomes a dominant noise factor against the inner noise of the receiving system. Thus, even if the transmission power is increased, the transmission quality may not be improved. To solve such a problem, in the high speed wireless data transmission system, some countermeasures against transmission distortion and so forth are taken.

For example, as one of the countermeasures against the transmission distortion and so forth in the high speed data transmission environment, OFDM (Orthogonal Frequency Division Multiplexing) method has been proposed. In the OFDM method, a signal is divided into several sub-carriers and transmitted in parallel on the frequency axis. This system is referred to as multi-carrier communication system. In particular, the carrier intervals can be minimized with an orthogonal function system so that a desired band width is decreased as small as a single carrier.

To convert the time axis into the frequency axis or vice versa in the OFDM method, FFT (Fast Fourier Transform) is used. Thus, it is not necessary to use a plurality of modulating/demodulating devices corresponding to individual sub-carriers. In addition, since the time axis is converted into the frequency axis or vice versa using FFT, the receiving portion that converts a received high frequency signal into an intermediate frequency signal can handle all carriers as one signal wave.

When the OFDM method is used, since the period of a symbol is expanded several times as large as the period of a sub-carrier, the influence of the inter-code interference can be remarkably reduced. However, as long as all carriers are handled as one signal wave, the influence against the frequency selective fading cannot be prevented.

FIG. 1A shows an influence of a frequency selective fading in the case of a single carrier. FIG. 1B shows an influence of a frequency selective fading in the case of a multi-carrier of which the signal shown in FIG. 1A is processed corresponding to the OFDM method. In FIGS. 1A and 1B, the horizontal axis and the vertical axis represent a frequency and a signal level, respectively.

As shown in FIG. 1B, the correlation in the frequency band of each divided carrier unit is high. However, as with the case shown in FIG. 1A, in the entire frequency band, the correlation of levels of individual levels is low. Thus, the influence of the frequency selective fading cannot be prevented. Thus, the influence of the frequency selective fading is a critical problem of the OFDM method.

To solve the above-described problem of the OFDM method, a sub-band division space diversity method has been proposed. In the sub-band division space diversity method, one frequency band is divided into several sub-bands. A diversity combining process is performed for each of the sub-bands so as to remove a dip due to a fading on the frequency axis or the time axis.

Next, with reference to FIGS. 2A, 2B, 2C, and 2D, a process for dividing one frequency band into five sub-bands, selecting higher output level portions from the divided sub-bands, and combining the selected portions is described. In this example, the process is performed by three antenna and receiving portions.

FIG. 2A shows characteristics of sub-bands a1 to a5 formed by the first antenna and receiving portion as the first channel. FIG. 2B shows characteristics of sub-bands b1 to b5 formed by the second antenna and receiving portion as the second channel. FIG. 2C shows characteristics of sub-bands c1 to c5 formed by the third antenna and receiving portion as the third channel.

When the diversity combining process is performed for individual output signals having such characteristics, a portion having a high output level portion is selected from each sub-band of each channel. Thus, as shown in FIG. 2D, an output signal of which the sub-bands c1 and c3 formed by the third antenna and receiving portion, the sub-bands b2 and b4 formed by the second antenna and receiving portion, and the sub-band a5 formed by the first antenna and receiving system is obtained free of dip portions.

Generally, in the high speed data transmission environment, since the amount of information transmitted per unit time is large, there is a tendency whereby a relatively large transmission power is required. For example, to accomplish the communication quality and communication area for the low speed data transmission environment, the transmission power should be increased in proportion to the amount of information.

However, in reality, since the power consumption of the apparatus and the power amplifier module thereof have their limitations, the communication area is deteriorated. To solve this problem, with a plurality of discrete antenna and receiving portions, a fading margin is improved.

For example, when the number of discrete antenna and receiving portions is increased from two to four, assuming that the instantaneous power failure ratio is 0.1%, the required fading margin decreases from 15 dB to 7 dB. This effect is equivalent to the case of which the transmission power is increased by 8 dB. When the number of antenna and receiving portions is increased, characteristic benefits are obtained. However, since the increase of the number of antenna and receiving portions causes the circuit scale and the cost thereof to increase. Thus, when a plurality of antenna and receiving portions are used, it seems that selective combining method that is the simplest method may be properly used.

FIG. 3 is a block diagram showing the structure of a diversity receiving apparatus corresponding to OFDM method using the conventional sub-band division space diversity that has been described.

In FIG. 3, an antenna group 101 is composed of n antennas $101_1$, $101_2$, ..., and $101_n$ that are spaced each other. The antennas $101_1$, $101_2$, ..., and $101_n$ are for example non-directivity antennas such as whip antennas and helical antennas.

The antennas $101_1$, $101_2$, ..., and $101_n$ receive a signal from a remote terminal. The received signal is a signal of which data has been primary modulated corresponding to QPSK (Quadrature Phase Shift keying) method or QAM (Quadrature Amplitude Modulation) and then secondary modulated corresponding to OFDM method.

Output signals of the antennas $101_1$, $101_2$, ..., and $101_n$ are supplied to receiving portions $102_1$, $102_2$, ..., and $102_n$, respectively. Each of the receiving portions $102_1$, $102_2$, ..., and $102_n$ has a high frequency amplifying circuit, a frequency converting circuit, an AGC (Automatics Gain Control) circuit, and so forth.

The receiving portions $102_1$, $102_2$, ..., and $102_n$ amplify received signals of the antennas $101_1$, $101_2$, ..., and $101_n$, respectively. Thereafter, the receiving portions $102_1$, $102_2$, ..., and $102_n$ limit their frequency bands, convert the received signals into intermediate frequency signals, and perform an AGC operation for the intermediate frequency signals. With control signals of the AGC circuits of the receiving portions $102_1$, $102_2$, ..., and $102_n$, the strengths of the received signals of the receiving portions $102_1$, $102_2$, ..., and $102_n$ are detected. The detected strengths of the received signals are supplied to multiplying devices $107_1$, $107_2$, ..., and $107_n$, respectively.

Output signals of the receiving portions $102_1$, $102_2$, ..., and $102_n$ are supplied to multiplying devices $103_1$, $103_2$, ..., and $103_n$, respectively. Window signals are supplied from receiving window circuits $104_1$, $104_2$, ..., and $104_n$ to the multiplying devices $103_1$, $103_2$, ..., and $103_n$, respectively. The multiplying devices $103_1$, $103_2$, ..., and $103_n$ limit an effective symbol period and extract predetermined portions.

Output signals of the multiplying devices $103_1$, $103_2$, ..., and $103_n$ are supplied to FFT circuits $105_1$, $105_2$, ..., and $105_n$, respectively. The FFT circuits $105_1$, $105_2$, ..., and $105_n$ convert respective parallel signals on the frequency axis into respective serial signals on the time axis and perform an OFDM demodulating process for the serial signals. Output signals of the FFT circuits $105_1$, $105_2$, ..., and $105_n$ are supplied to a branch selecting circuit 108.

Output signals of the FFT circuits $105_1$, $105_2$, ..., and $105_n$ are supplied to received power detecting devices $106_1$, $106_2$, ..., and $106_n$, respectively. The received power detecting devices $106_1$, $106_2$, ..., and $106_n$ detect the strengths of individual sub-bands of individual branches. Output signals of the received power detecting devices $106_1$, $106_2$, ..., and $106_n$ are supplied to the multiplying devices $107_1$, $107_2$, ..., and $107_n$, respectively. Output signals of the multiplying devices $107_1$, $107_2$, ..., and $107_n$ are supplied to the branch selecting circuit 108.

The branch selecting circuit 108 compares the strengths of the individual sub-bands of the individual branches and selects a signal of a branch having the highest level. In other words, the AGC circuits of the receiving portions $102_1$, $102_2$, ..., and $102_n$ detect the strengths of signals of the entire frequency bands of the individual branches. The received power detecting devices $106_1$, $106_2$, ..., and $106_n$ detect the strengths of received signals of the individual sub-bands of the individual branches. Corresponding to the obtained strengths, the branch selecting circuit 108 selects a branch.

An output signal of the branch selecting circuit 108 is supplied to a demodulating circuit 109. The demodulating circuit performs a demodulating process for data that has been primarily modulated corresponding to QPSK or QAM method. An output signal of the demodulating circuit 109 is obtained through an output terminal 110.

As another detecting method for strength information of each sub-band, it may be detected with a filter having a very high Q. However, since the Q of the filter is limited, this method is not practical. As another detecting method, the strength information may be detected on the time division basis in a time period shorter than the fading period. However, since the period of an OFDM symbol is long and it takes a time to perform the FFT calculation, this method is not practical. Thus, the above-mentioned method is used to detect strength information.

However, in the conventional diversity receiving apparatus of which the selective combining method is applied for a receiving system corresponding to OFDM method using the above-described sub-band division space diversity, the strengths of received signals of individual sub-bands of individual branches are detected. Corresponding to the detected result, a branch is selected. Thus, circuits that detect the strengths of signals of individual sub-bands should be disposed for individual branches. In other words, in the above-described example, it is necessary to disposed the FFT circuits $105_1$, $105_2$, ..., and $105_n$ and the received power detecting devices $106_1$, $106_2$, ..., and $106_n$ for the individual branches. Thus, according to the related art reference, the size and cost of the apparatus cannot be reduced.

OBJECTS AND SUMMARY OF THE INVENTION

Therefore, an object of the present invention is to provide a diversity receiving apparatus that prevents an OFDM type receiving system from being affected by a frequency fading and that allows the circuit scale to be reduced.

To solve the above-described problem, the present invention is a diversity receiving apparatus for receiving data that has been primarily modulated and then secondarily modulated, comprising a plurality of uni-directivity antennas arranged so that they orient in different directions relative to each other, a signal information detecting means for detecting signal information of all frequency bands of received signals of each of the uni-directivity antennas, a branch selecting means for selecting one of received signals of the individual branches received by the uni-directivity antennas, a secondarily modulated data demodulating means for demodulating data that has been secondarily modulated as the received signal selected by the branch selecting means, and a primarily modulated data demodulating means for primarily demodulating data that has been primarily modulated as an output signal of the secondarily modulated data demodulating means, wherein the branch selecting means is controlled corresponding to an output signal of the signal information detecting means.

According to the present invention, a plurality of uni-directivity antennas are disposed so that they are oriented in different directions. With the uni-directivity antennas, a received wave is separated. Thus, the fading dip decreases. Consequently, it is not necessary to dispose received signal strength detecting means for individual sub-bands unlike with the related art reference. Thus, the circuit scale and cost can be reduced.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a block diagram showing the structure of the conventional diversity receiving apparatus;

DETAILED DESCRIPTION OF THE PREFERRED EMBODIMENT

Figure 1A:
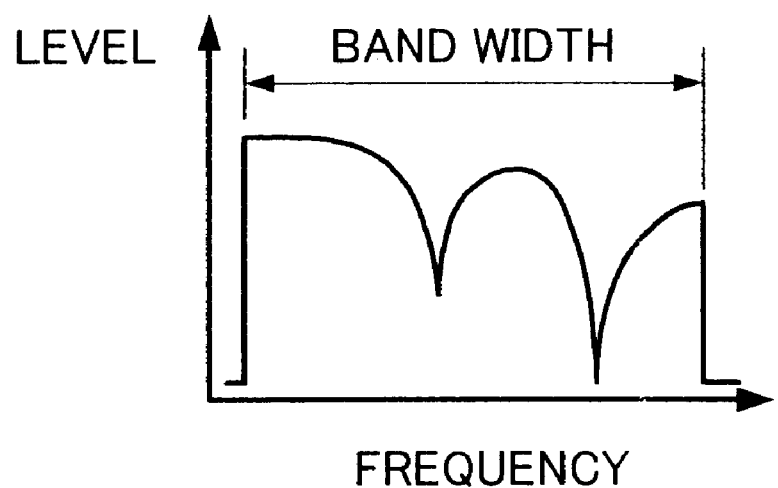
FIGS. 1A and 1B are characteristic diagrams for explaining a conventional diversity receiving apparatus.
Figure 1B:
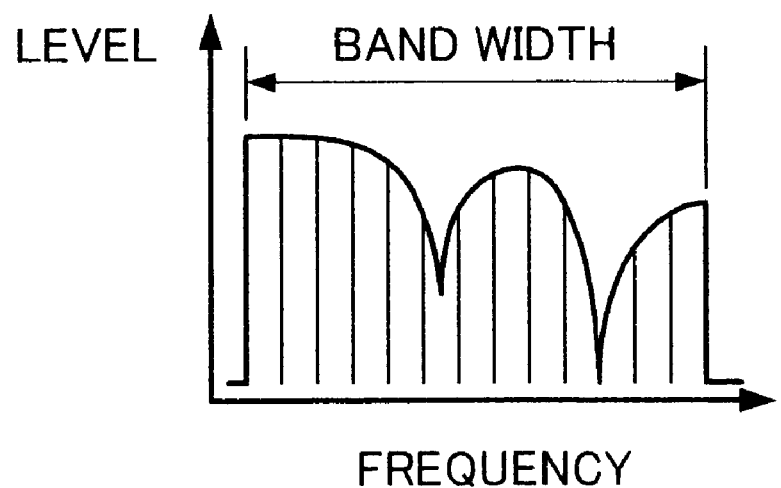
Figure 2A:
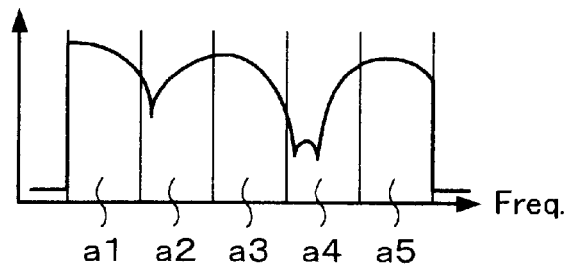
FIGS. 2A, 2B, 2C, and 2D are characteristic diagrams for explaining the conventional diversity receiving apparatus.
Figure 2B:
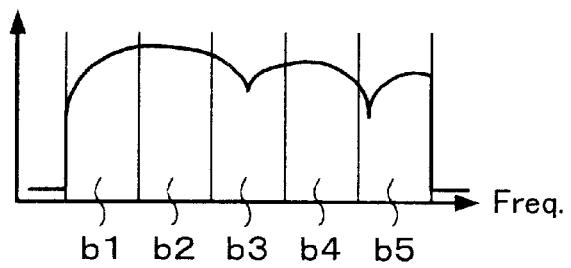
Figure 2C:
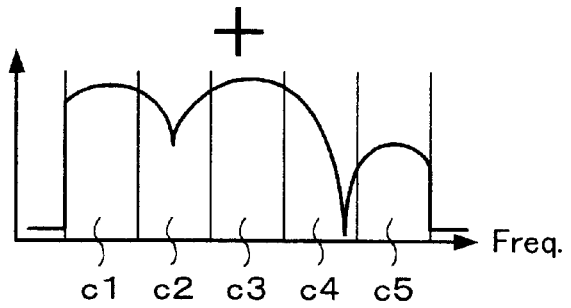
Figure 2D:
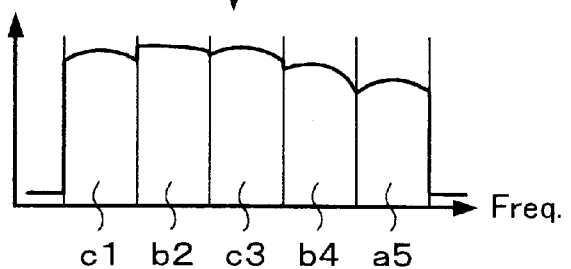
Figure 4:
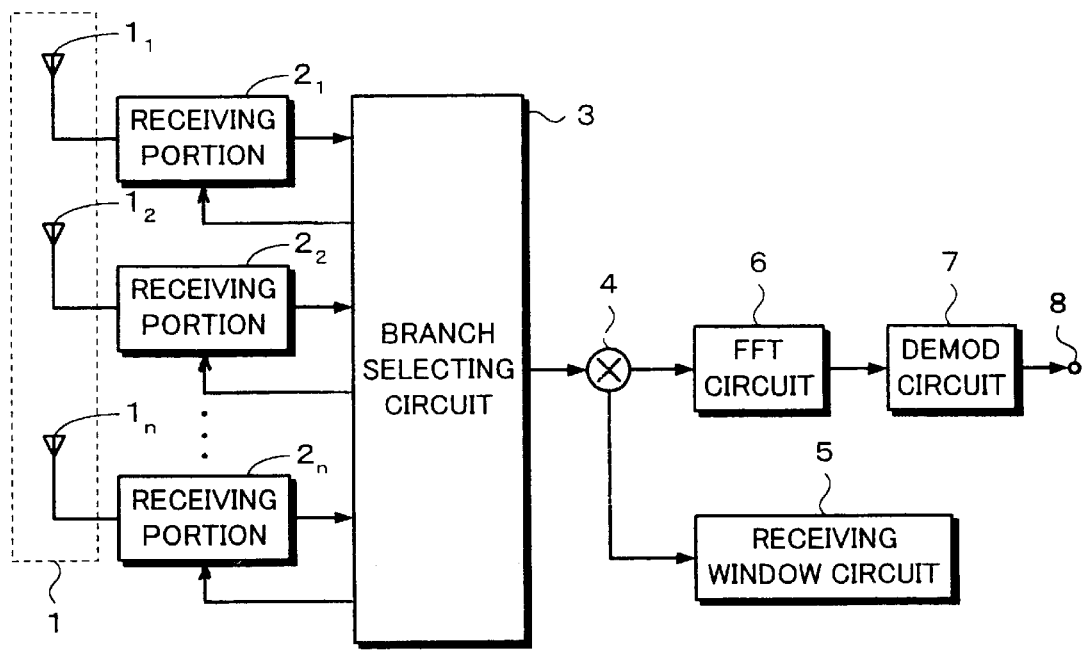
FIG. 4 is a block diagram showing the overall structure of an embodiment of the present invention.

Next, with reference to the accompanying drawings, an embodiment of the present invention will be described. FIG. 4 shows the overall structure of the embodiment of the present invention. In FIG. 4, reference numeral 1 is an antenna group. The antenna group 1 is composed of n uni-directivity antennas $1_1$, $1_2$, ..., and $1_n$. The uni-directivity antennas $1_1$, $1_2$, ..., and $1_n$ are disposed in different directivity directions so that the space is divided into n regions.

Figure 5:
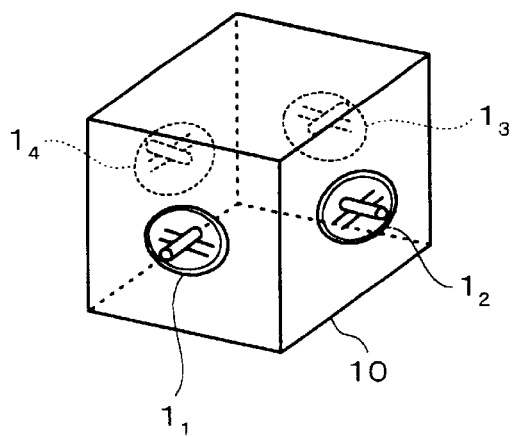
FIG. 5 is an external view for explaining an antenna group according to the embodiment of the present invention.
Figure 6:
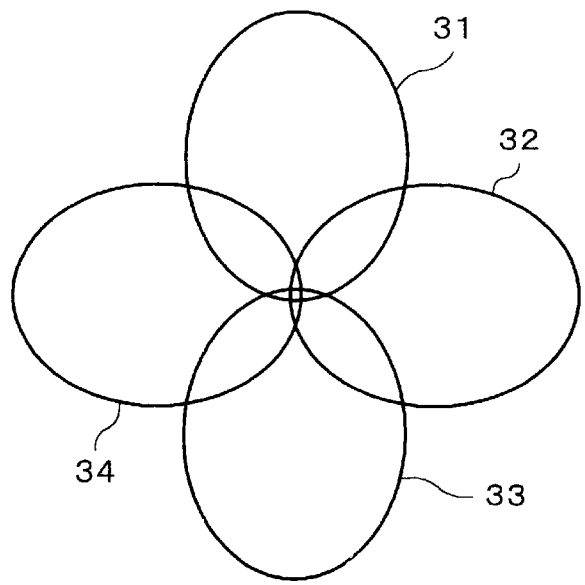
FIG. 6 is a characteristic diagram for explaining an antenna group according to the embodiment of the present invention.

FIG. 5 shows an example of which four uni-directivity antennas are disposed. FIG. 6 shows directivity characteristics of the uni-directivity antennas disposed as shown in FIG. 5.

As shown in FIG. 5, the uni-directivity antennas $1_1$, $1_2$, $1_3$, and $1_4$ are disposed on four surfaces as side portions of a cubic pedestal 10. The uni-directivity antennas are for example Yagi antennas or parabola antennas. Thus, as shown in FIG. 6, the space is divided into four regions at intervals of 90° with the directivity of the uni-directivity antenna $1_1$ (the directivity is denoted by reference numeral 31), the directivity of the uni-directivity antenna $1_2$ (the directivity is denoted by reference numeral 32), the directivity of the uni-directivity antenna $1_3$ (this directivity is denoted by reference numeral 33), and the directivity of the uni-directivity antenna $1_4$ (this directivity is denoted by reference numeral 34).

According to the present invention, it should be noted that the number of antennas is not limited to four and that the arrangement thereof is not limited to that shown in FIG. 6. For example, both the directivities of the antennas $1_1$, $1_2$, $1_3$, ..., and $1_n$ and the arrangement thereof may be changed.

The uni-directivity antennas $1_1$, $1_2$, $1_3$, ..., and $1_n$ arranged in different directivity directions receive from another terminal a signal of which data has been primarily modulated corresponding to QPSK or QAM method and then secondarily modulated corresponding to OFDM method. Output signals of the antennas $1_1$, $1_2$, ..., and $1_n$ are supplied to receiving portions $2_1$, $2_2$, ..., and $2_n$, respectively.

Each of the receiving portions $2_1$, $2_2$, ..., and $2_n$ has a high frequency amplifying circuit, a frequency converting circuit, and an AGC circuit. The receiving circuits $2_1$, $2_2$, ..., and $2_n$ amplify the received signals of the antennas $1_1$, $1_2$, ..., and $1_n$, limit their frequency bands, perform the AGC operation for the resultant signals, and convert the resultant signals into their intermediate frequency signals. Output signals of the receiving circuits $2_1$, $2_2$, ..., and $2_n$ are supplied to a branch selecting circuit 3.

The AGC circuits of the receiving circuits $2_1$, $2_2$, ..., and $2_n$ output received signal strength information (RSSI) of all the frequency bands of the received signals of the individual branches. The received signal strength information of the receiving portions $2_1$, $2_2$, ..., and $2_n$ is supplied to the branch selecting circuit 3.

The branch selecting circuit 3 selects an output signal of the receiving circuit $2_1$, $2_2$, ..., or $2_n$. corresponding to the received signal strength information of all the frequency bands of the individual branches. In other words, the branch selecting circuit 3 determines the received signal strength of all the frequency bands of each of the receiving portion $2_1$, $2_2$, ..., and $2_n$ and selects a signal of a branch having the highest signal strength.

An output signal of the branch selecting circuit 3 is supplied to a multiplying device 4. In addition, a window signal is supplied from a receiving window circuit 5 to the multiplying device 4. The multiplying device 4 limits an effective symbol period and extracts a predetermined portion.

An output signal of the multiplying device 4 is supplied to an FFT circuit 6. The FFT circuit 6 converts a parallel signal on the frequency axis into a serial signal on the time axis and demodulates the serial signal corresponding to OFDM method.

An output signal of the FFT circuit 6 is supplied to a demodulating circuit 7. The demodulating circuit 7 performs a demodulating process for data that has been primarily modulated corresponding to QPSK or QAM method. An output signal of the demodulating circuit 7 is obtained through an output terminal 8.

According to the embodiment of the present invention, since a directivity branch structure having the uni-directivity antennas $1_1$, $1_2$, ..., and $1_n$ is used, the frequency selective fading that is a drawback of the OFDM method is suppressed. Next, a method for suppressing the frequency selective fading will be described in detail.

The present invention was made from a view point of a phenomenon of a narrow directivity antenna that has a large correlation of a frequency band (namely, the correlation in a frequency band is reversely proportional to the directivity of an antenna). Thus, the correlation band width of a non-directivity antenna is different from that of a directivity antenna. Next, this phenomenon will be described in comparison between a space branch structure of which conventional non-directivity antennas are used and a directive branch structure of which uni-directivity antennas are used.

Figure 7A:
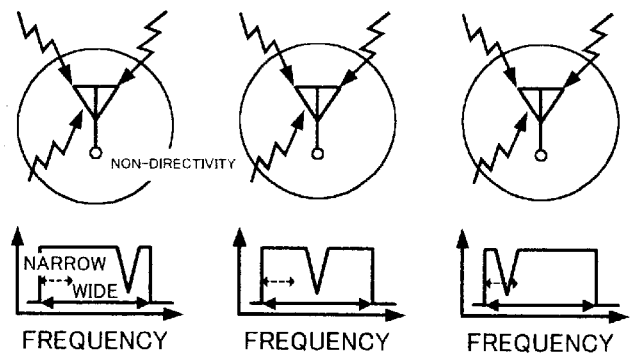
FIGS. 7A and 7B are schematic diagrams for explaining the embodiment of the present invention.

FIG. 7A is a schematic diagram showing the concept of a space branch structure using conventional non-directivity antennas. In the space branch structure, since the antennas have no directivities, the antennas can equally receive some branch waves. Thus, the antennas are arranged in different positions so that their space correlations become small. Consequently, fading dips are shifted on the frequency axis as represented by graphs shown in FIG. 7A. This structure is effective for a narrow band signal against the fading, not for a broad band signal. Thus, each received signal should be divided into sub-bands by FFT calculations so as to select a frequency band free of dips.

Figure 7B:
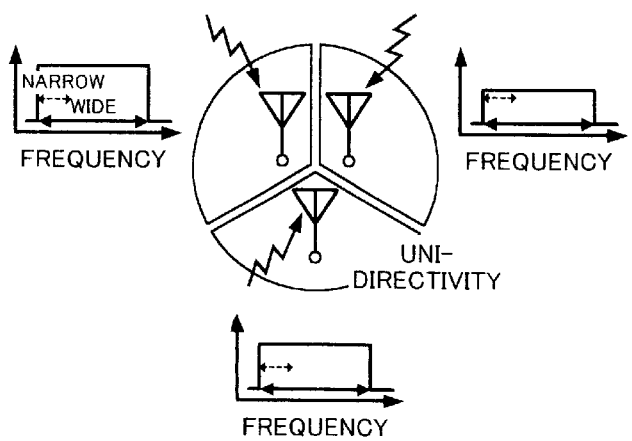

FIG. 7B is a schematic diagram showing the concept of the directivity branch structure according to the present invention. Since the directivity branch structure allows a received wave to be separated, fading dips can be decreased as represented by graphs shown in FIG. 7B. However, in the directivity branch structure, the fading dips cannot be perfectly decreased. That effect depends on the relation between the number of received waves and the number of divided branches. In other words, the effect is proportional to the number of branches and reversely proportional to the angle of the directivity of each antenna.

Thus, the directivity division branch structure using uni-directivity antennas allows a frequency selective fading that is a drawback of the OFDM method to be suppressed along with the sub-band division space diversity. In addition, unlike with the conventional diversity receiving apparatus, the directivity division branch structure does not need to obtain signal strength information for each sub-band, but the signal strength of all the frequency bands of each branch. Thus, when the selective combining method is used, a circuit scale necessary for each branch can be sufficiently reduced. Consequently, although a fading margin is achieved with a multi-branch structure, the power consumption and the cost of the apparatus can be reduced.

In the above-described embodiment, the received signal strength information is used as a criterion for selecting a branch. Alternatively, received signal quality information such as an error rate of a received signal of each branch may be used as a selection criterion. In this case, when there is an external interference noise wave, it can be removed as a side effect.

In the above-described embodiment, the AGC circuit at the last stage of each of the receiving portion $2_1, 2_2, \ldots,$ and $2_n$ generates the received signal strength information. Alternatively, a circuit block upstream of the intermediate frequency signal converting portion may generate the received signal strength information or quality information. As another alternative method, a circuit block downstream of the intermediate frequency signal converting portion may be disposed on the next stage of the branch selecting circuit 3. In this case, the apparatus may be more simplified.

According to the present invention, the multi-branch selective combining method is used in such a manner that the circuit scale of the receiving apparatus according to the OFDM method is remarkably reduced. In addition, a transmission distortion can be suppressed and the transmission power can be reduced. In particular, when the present invention is applied to a home wireless network that will remarkably grow in near future, a system with low power consumption and at low cost can be accomplished.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A diversity receiving apparatus for receiving data that has been primarily modulated and then secondarily modulated, comprising:

a plurality of uni-directivity antennas arranged to be oriented in different directions so as to be directionally orthogonal relative to each other for respectively receiving signals;

signal information detecting means for detecting signal information of all frequency bands of the signals received by each of said plurality of uni-directivity antennas;

branch selecting means for selecting one of the signals received by said plurality of uni-directivity antennas as an individual branch for demodulating;

a single secondarily modulated data demodulating circuit for demodulating data that was secondarily modulated in the received signal selected by said branch selecting means; and a single primarily modulated data demodulating circuit for primarily demodulating data that was primarily modulated from an output signal of said secondarily modulated data demodulating circuit, wherein said branch selecting means is controlled in response to an output signal of said signal information detecting means.

2. The diversity receiving apparatus as set forth in claim 1, wherein said signal information detecting means detects a signal strength of all frequency bands of the signals received by said plurality of uni-directivity antennas.

3. The diversity receiving apparatus as set forth in claim 1, wherein said signal information detecting means detects a quality of the signals received by said plurality of uni-directivity antennas.

4. The diversity receiving apparatus as set forth in claim 3, wherein said signal information detecting means detects an error rate of the signals received by said plurality of uni-directivity antennas.

5. The diversity receiving apparatus as set forth in claim 1, wherein the secondary modulation is performed corresponding to an orthogonal frequency division multiplexing method and said single secondarily modulated data demodulating circuit performs demodulation thereof.

* * * * *